(12) United States Patent
Fanucci et al.

(10) Patent No.: US 8,066,836 B2
(45) Date of Patent: Nov. 29, 2011

(54) PREPEG PULTRUSION

(75) Inventors: Jerome P. Fanucci, Lexington, MA (US); Pavel Bystricky, Lexington, MA (US)

(73) Assignee: Kazak Composites, Inc., Woburn, MA (US)

( * ) Notice: Subject to any disclaimer, the term of this patent is extended or adjusted under 35 U.S.C. 154(b) by 0 days.

(21) Appl. No.: 12/286,300

(22) Filed: Sep. 29, 2008

(65) Prior Publication Data

US 2009/0126860 A1    May 21, 2009

Related U.S. Application Data

(60) Provisional application No. 60/995,859, filed on Sep. 28, 2007.

(51) Int. Cl.
    *B29C 70/04* (2006.01)
(52) U.S. Cl. ....................................................... 156/181
(58) Field of Classification Search ................... 156/181
    See application file for complete search history.

(56) References Cited

U.S. PATENT DOCUMENTS

| | | | | |
|---|---|---|---|---|
| 4,012,267 A | * | 3/1977 | Klein | 156/178 |
| 4,496,697 A | * | 1/1985 | Zsolnay et al. | 526/60 |
| 4,832,894 A | | 5/1989 | Luise | |
| 4,883,552 A | * | 11/1989 | O'Connor et al. | 156/180 |
| 5,264,060 A | | 11/1993 | Lambing et al. | |
| 5,711,992 A | * | 1/1998 | Heitkamp et al. | 427/243 |
| 6,852,192 B2 | * | 2/2005 | Sato et al. | 156/292 |
| 7,520,223 B2 | * | 4/2009 | Sharpe et al. | 102/303 |
| 2008/0276808 A1 | * | 11/2008 | Sus et al. | 99/373 |

FOREIGN PATENT DOCUMENTS

JP          53134874 A   *  11/1978

* cited by examiner

*Primary Examiner* — Katarzyna Wyrozebski Lee
*Assistant Examiner* — Daniel Lee
(74) *Attorney, Agent, or Firm* — Weingarten, Schurgin, Gagnebin & Lebovici LLP

(57) ABSTRACT

Continuous pultrusion of prepreg material systems is provided. A prepreg material, comprising fibers infiltrated with a partially cured resin, is introduced into a pultrusion die with a barrier layer between surfaces of the prepreg material and facing inner surfaces of the die. The prepreg material and the barrier layers are continuously pulled through the pultrusion die. The barrier layer is removed from each surface of the prepreg material after exiting the die.

26 Claims, 2 Drawing Sheets

PREPEG PULTRUSION

CROSS REFERENCE TO RELATED APPLICATIONS

This application claims the benefit under 35 U.S.C. §119 (e) of U.S. Provisional Application No. 60/995,859, filed on Sep. 28, 2007, the disclosure of which is incorporated by reference herein.

STATEMENT REGARDING FEDERALLY SPONSORED RESEARCH OR DEVELOPMENT

N/A

BACKGROUND OF THE INVENTION

Pultrusion processes traditionally use wet resin to impregnate dry fibers prior to the fibers being pulled through a pultrusion die. Pultrusion of pre-impregnated (prepreg) fiber/resin combinations is more difficult, due to adhesion of the resin to the die and the much longer cure cycle times.

Certain aerospace prepreg material systems are pre-qualified for use in military applications. These material systems are typically not usable in pultrusion processes due to the difficulty of pultruding prepreg material systems.

SUMMARY OF THE INVENTION

The present invention relates to the continuous pultrusion of consolidated prepreg laminates. Pultrusion resins are typically formulated with additives to prevent adhesion of the composite resin to the pultrusion die surfaces (internal mold release). Prepreg materials, a prefabricated and partially cured combination of resin and fiber commonly used in high performance aerospace hardware, are not formulated this way, so the present invention provides another approach to prevent mold sticking/bonding. This approach is to co-pultrude a continuous barrier film between the prepreg and the mold wall that has a low coefficient of friction and low adhesion to reduce friction and bonding during pultrusion. This film is peeled from the finished part surface after cure.

DESCRIPTION OF THE DRAWINGS

The invention will be more fully understood from the following detailed description taken in conjunction with the accompanying drawings in which.

DETAILED DESCRIPTION OF THE INVENTION

The disclosure of U.S. Provisional Application No. 60/995,859, filed on Sep. 28, 2007, is incorporated by reference herein.

Typical pultrusion resins have low viscosity, so they are able to infiltrate dry fibers with relative ease. Excess resin is squeezed out before entering the die, and the product is cured in the die. Typical pultrusion resins are formulated with lubricating additives to prevent adhesion of the composite resin to the tooling surfaces.

In prepreg material systems, the resin is already B-staged or partially cured within the fibers. The curing conditions, such as time to cure, while dependent on the particular resin, generally differ from the curing conditions for the wet resins used in pultrusion processes. In addition, trying to pultrude a thin prepreg through a die opening results in friction forces inside the die exceeding the tensile strength of the reinforcing fibers. The lubricating additives used in pultrusion resins are not presently included in aerospace prepreg material systems that have been pre-qualified for use in military and aerospace applications. Modifying the baseline aerospace resins with the inclusion of such lubricating additives would, however, invalidate the pre-existing material qualifications.

The present method overcomes these difficulties by encapsulating a prepreg material system with a non-sticking surface layer that creates a low friction barrier between the prepreg and the tooling surface. The barrier layer also provides additional material to pull through the die and fills additional space within the die. The barrier layer is subsequently peeled from the finished part surface after cure.

Suitable barrier layers can include a film or films formed from fluoropolymers such as fluorinated ethylene propylene (FEP) and tetrafluoroethylene (TFE or TEFLON®) and polyvinylidene difluoride (PVDF). Suitable materials have a low coefficient of friction and low adhesion to reduce friction and bonding during pultrusion. Barrier layers can also include glass or other fiber layers.

The resins used in the prepreg material systems generally have a longer cure time than the resins typically used in pultrusion processes. The longer cure time of these resins (hours instead of minutes) can be implemented in pultrusion by, for example, increasing the length of the die, or by reducing pultrusion speed, or both. Alternatively or in addition, a secondary post cure can be added to the process.

Figure 1:
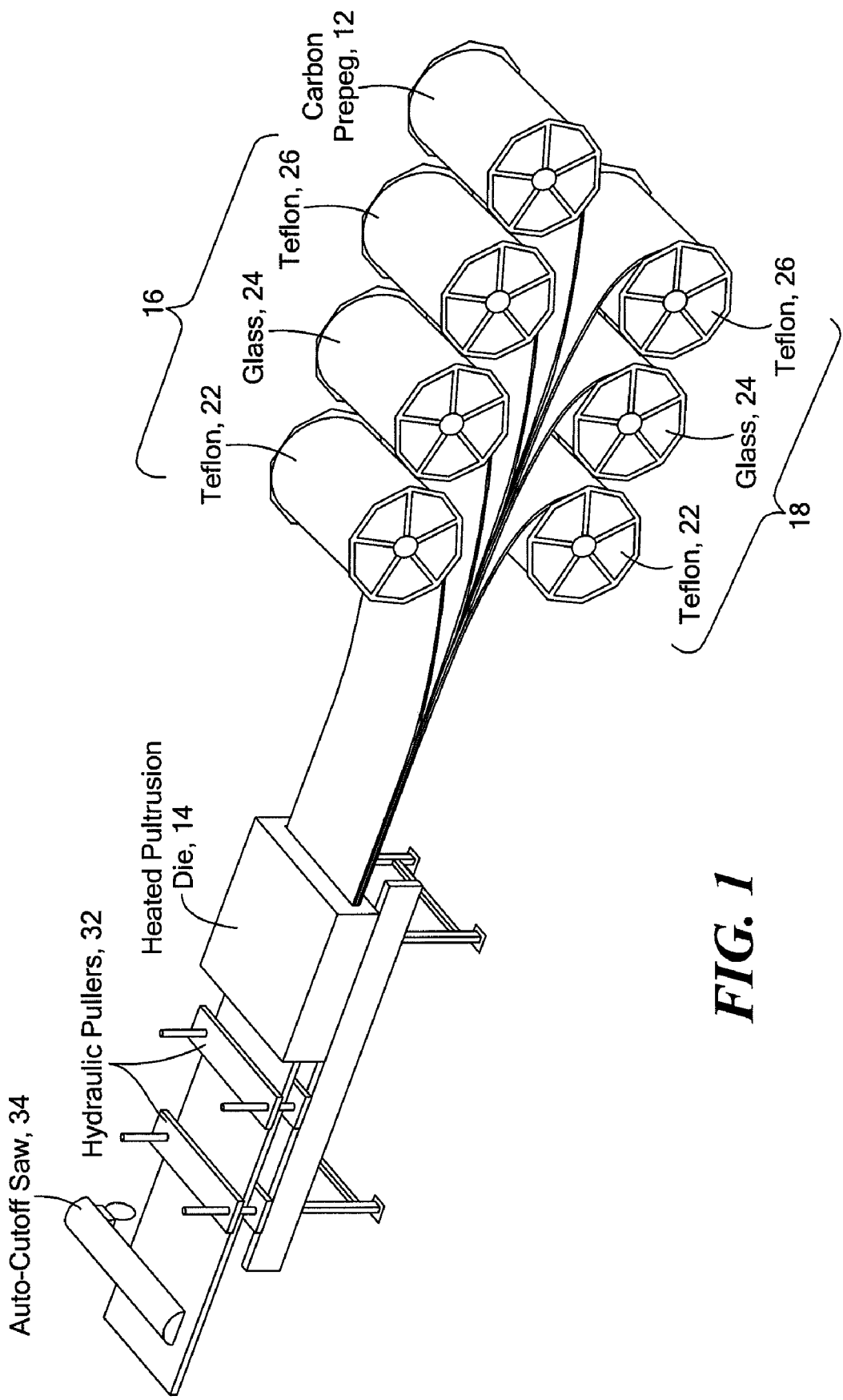
FIG. 1 is a schematic illustration of a first embodiment of a prepreg pultrusion process according to the invention.

A schematic drawing of one embodiment of a prepreg pultrusion set-up is presented in FIG. 1. A prepreg layer 12, for example of carbon fibers, is fed into a heated pultrusion die 14. Multiple plies or layers of the prepreg material can be used. The prepreg can be in the form of a lay up of plies or layers at various angles, such as 0°, 90°, ±45°. The prepreg layer is sandwiched between upper and lower barrier layers 16, 18 of dry fabric. The barrier layers can be made of, for example, fiberglass and/or a low friction material such as TFE (such as TEFLON®). The barrier layers help to adjust internal die pressure and to overcome friction forces, particularly when pultruding very thin section composite materials (for example, as thin as on the order of 0.030" to 0.050"), although thicker prepregs can also be used. In the embodiment illustrated, a sequence of a TFE layer 22, a fiberglass layer 24, and a TFE layer 26 is used. The two PTFE layers 22, 26 prevent sticking of the prepreg layer 12 to the tooling surface, and the glass layer 24 provides additional material for the pullers 32 to pull on and to fill the space in the die to adjust pressure. However, any suitable number and sequence of layers can be used. For example, a single TFE or glass layer may be sufficient to prevent sticking to the prepreg and the tooling surface and to provide additional material to pull through the die without breaking the prepreg. Alternatively, a low friction barrier film can be adhered to the tooling surfaces. After exiting the die, the pultruded composite material can be cut to any suitable length by a saw 34.

The process illustrated in FIG. 1 yields a consolidated solid laminate panel. Panels of solid laminates can be cut at angles other than square and then bonded or riveted together to simulate a type of tapered connection required to make a tapered structural form, such as a tapered tailcone form constant cross section panel.

In one test example, the prepreg used was IM7/X8551-7A, a carbon fiber, epoxy resin, unidirectional tape. In the example, the prepreg tape has a thickness of 0.007". The dry filler material on each side of the prepreg was composed of two layers of TFE (0.002" each) and three layers of woven glass fabric (2×0.044" plus 1×0.012") for a total thickness of dry material of approximately 0.208"Filler material layers take up space in the die, acting in a manner analogous to the pressure knob on an autoclave by permitting adjustment to the through-thickness compaction force being applied to the prepreg as it moves through the rigid opening of the tool. Several layers of prepreg tape were fed into the die, starting with three stacked plies and later adding a fourth and then a fifth ply.

In this test example, a 5-foot long die with a narrow entrance opening (0.25") was employed. Pultrusion speed was varied from less than 0.5"/min initially to about 5"/min at the end of the run. Heaters on the die were arranged such that the hot zone (set for a target internal temperature of 350° F.) spanned the back ¾ of the die length. The front of the die was not heated directly, yielding a temperature gradient where the prepreg was heated progressively before reaching the hot zone. Temperature at the entrance to the die was 141° F. An inline preheat zone may be added in front of the die entrance to bring approaching prepreg layers up to approximately 150° F. before being compressed into the die. This makes more efficient use of the time under compression in the tool, to improve process line speed and also help promote squeeze-out of any interlaminar air and voids. Adjustments to the processing feed system on the fly can be made, to adjust the quality of the product and achieve a more uniform laminate.

The laminate produced in this example seemed well cured, even at the faster pultrusion speed. The thickness was as would be expected in a well consolidated part.

Figure 2:
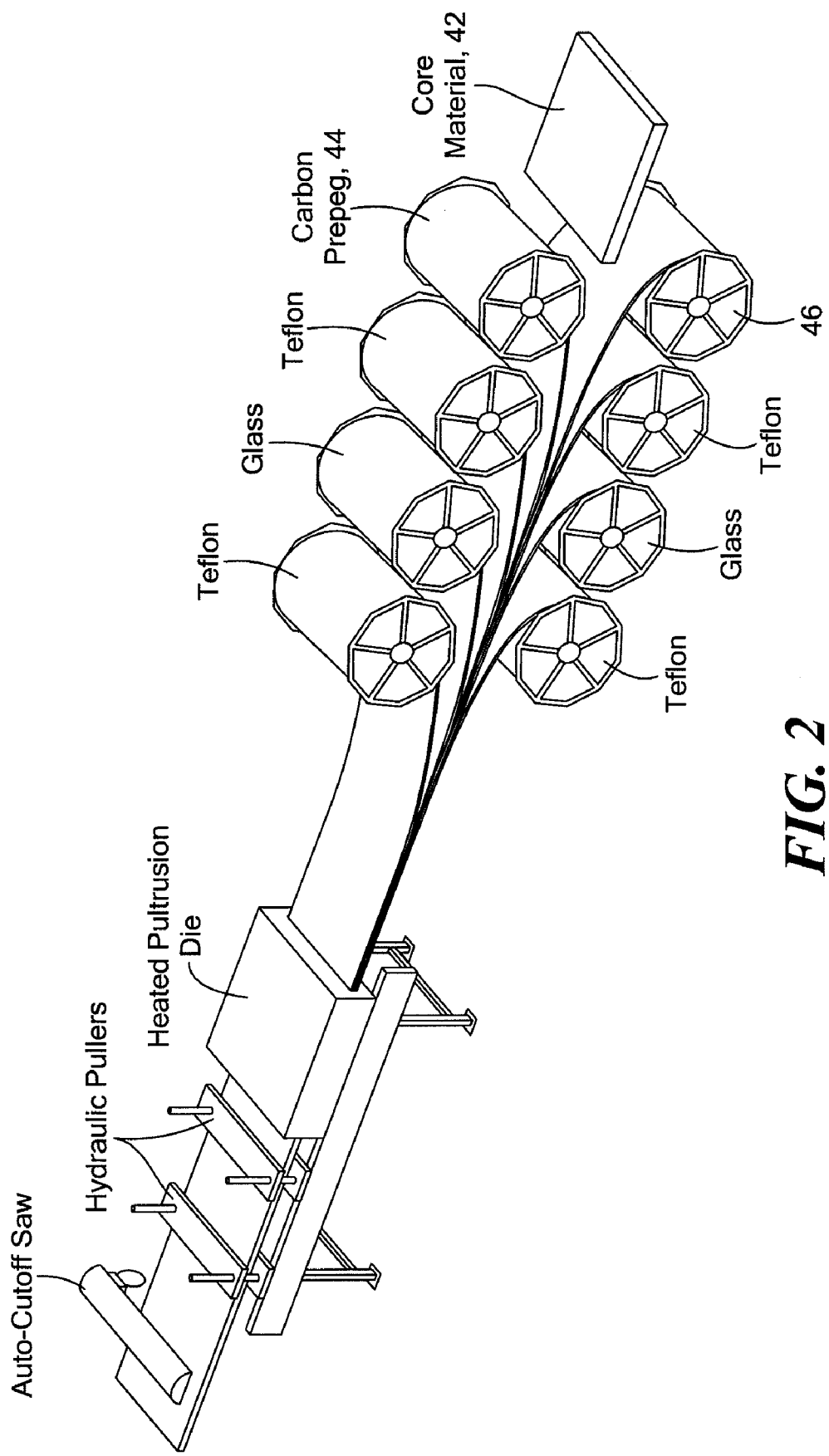
FIG. 2 is a schematic illustration of a further embodiment of a prepreg pultrusion process to provide a sandwich panel pultrusion with prepreg facesheets.

FIG. 2 shows a set-up similar to that described above and including a core material 42 fed between top and bottom prepreg facesheets 44, 46, resulting in pultrusion of a sandwich panel. A variety of cores, including cores of a lighter weight material, can be employed in this process. Various features can be included to facilitate joining of two panels. For example, sandwich cores can be tapered away near panel boundaries to create solid laminate perimeters that can be riveted or bonded.

In another embodiment, a prepreg material system can be included along with the pultrusion of dry fibers that are wet out with resin, for example, a resin bath, if the resin curing conditions are compatible.

The prepreg pultrusion process described herein can be used to fabricate many composite structures, including floor beams and decks and aircraft parts such as helicopter tailcone structures. The pultrusion process produces constant cross-section shapes in an automated process that requires very little labor after setup. Accordingly, pultruded beams may offer substantial cost reduction compared with conventional hand layup and autoclave cure of composite constant section beam designs, with cross sections, for example, with shapes like I, C, L, X, etc.

In one example, in the prepreg pultrusion of an I-beam, first, a continuous flat pattern feedstock is laid up for the two C section webs and the two caps. In production, this can be performed by automated tape layup machinery. The feedstock laminates are formed to shape and optionally brought together with a core material at the pultrusion die. The section is pultruded and cut to length. A possible free-standing oven postcure may be added.

The pultruded prepreg approach offers several advantages: No design change to the I-beam is required. Limited material qualification is required for military application, because identical fiber, resin, material form, material specification, and material quality requirements are used. A limited set of equivalency tests may be required to assure that the pultrusion cure cycle (and resultant mechanical properties) are statistically equivalent to the baseline autoclave cure cycle. The resulting product has identical service durability (moisture, temperature, service damage) results. Identical repair procedures can be used.

The invention is not to be limited by what has been particularly shown and described, except as indicated by the appended claims.

What is claimed is:

1. A process of forming a composite material comprising: providing a prepreg material comprising fibers infiltrated with an infiltrating material comprising a partially cured resin, wherein the infiltrating material does not include a pultrusion lubricating additive, the fibers having a tensile strength, the prepreg material having a thickness dimension;
preheating the prepreg material;
introducing the preheated prepreg material into a heated pultrusion die with a barrier layer between surfaces of the prepreg material and facing inner surfaces of the die, the barrier layer comprising a material that reduces friction and bonding between the prepreg material and the inner surfaces of the die, the barrier layer comprising a plurality of layers provided on each surface of the prepreg material; and continuously pulling the prepreg material and the barrier layers through the pultrusion die, the prepreg material consolidating and curing under heat and compression in the die.

2. The process of claim 1, further comprising removing the barrier layer from each surface of the prepreg material after exiting the die.

3. The process of claim 1, wherein the prepreg material comprises carbon fibers infiltrated with a partially cured epoxy resin.

4. The process of claim 1, wherein the prepreg material comprises one or more layers of preimpregnated fibers arranged in a lamination.

5. The process of claim 1, wherein the barrier layer on each surface comprises a film formed from a fluoropolymer.

6. The process of claim 1, wherein the barrier layer on each surface comprises a film formed from fluorinated ethylene propylene, tetrafluoroethylene, or polyvinylidene difluoride.

7. The process of claim 1, wherein the barrier layer on each surface comprises a fiber layer.

8. The process of claim 1, wherein the barrier layer on each surface comprises a fiberglass layer.

9. The process of claim 1, further comprising inserting a core material into the die, and the prepreg material forms facesheets on the core material.

10. The process of claim 9, wherein the core material tapers away at a boundary.

11. The process of claim 1, further comprising an additional step of further curing the prepreg material outside of the die.

12. The process of claim 1, wherein the prepreg material forms at least part of a constant cross-section beam introduced into the die.

13. The process of claim 1, wherein the die is heated with a temperature gradient with temperature increasing in the process direction.

14. A process of forming a composite material comprising: providing a prepreg material comprising fibers infiltrated with an infiltrating material comprising a partially cured resin, wherein the infiltrating material does not include a pultrusion lubricating additive, the fibers having a tensile strength, the prepreg material having a thickness dimension;

preheating the prepreg material;

introducing the preheated prepreg material into a heated pultrusion die with a barrier layer between surfaces of the prepreg material and facing inner surfaces of the die, the barrier layer comprising a material that reduces friction and bonding between the prepreg material and the inner surfaces of the die;

introducing dry fibers impregnated with wet resin into the die along with the prepreg material; and continuously pulling the prepreg material and the barrier layers through the pultrusion die, the prepreg material consolidating and curing under heat and compression in the die.

15. The process of claim 14, further comprising removing the barrier layer from each surface of the prepreg material after exiting the die.

16. The process of claim 14, wherein the prepreg material comprises carbon fibers infiltrated with a partially cured epoxy resin.

17. The process of claim 14, wherein the prepreg material comprises one or more layers of preimpregnated fibers arranged in a lamination.

18. The process of claim 14, wherein the barrier layer on each surface comprises a film formed from a fluoropolymer.

19. The process of claim 14, wherein the barrier layer on each surface comprises a film formed from fluorinated ethylene propylene, tetrafluoroethylene, or polyvinylidene difluoride.

20. The process of claim 14, wherein the barrier layer on each surface comprises a fiber layer.

21. The process of claim 14, wherein the barrier layer on each surface comprises a fiberglass layer.

22. The process of claim 14, wherein the barrier layer comprises a plurality of layers provided on each surface of the prepreg material.

23. The process of claim 14, further comprising inserting a core material into the die, and the prepreg material forms facesheets on the core material.

24. The process of claim 14, further comprising an additional step of further curing the prepreg material outside of the die.

25. The process of claim 14, wherein the prepreg material forms at least part of a constant cross-section beam introduced into the die.

26. The process of claim 14, wherein the die is heated with a temperature gradient with temperature increasing in the process direction.

* * * * *

UNITED STATES PATENT AND TRADEMARK OFFICE
CERTIFICATE OF CORRECTION

PATENT NO. : 8,066,836 B2  
APPLICATION NO. : 12/286300  
DATED : November 29, 2011  
INVENTOR(S) : Jerome P. Fanucci et al.

Page 1 of 1

It is certified that error appears in the above-identified patent and that said Letters Patent is hereby corrected as shown below:

On the Title page, Item [54] Title, "PREPEG PULTRUSION" should read --PREPREG PULTRUSION--;

Column 1, line 1, "PREPEG PULTRUSION" should read --PREPREG PULTRUSION--; and

Column 5, claim 14, line 13, "material and" should read --material, the fibers impregnated with wet resin, and--.

Signed and Sealed this

Thirteenth Day of March, 2012

David J. Kappos
*Director of the United States Patent and Trademark Office*